United States Patent Office 2,897,127
Patented July 28, 1959

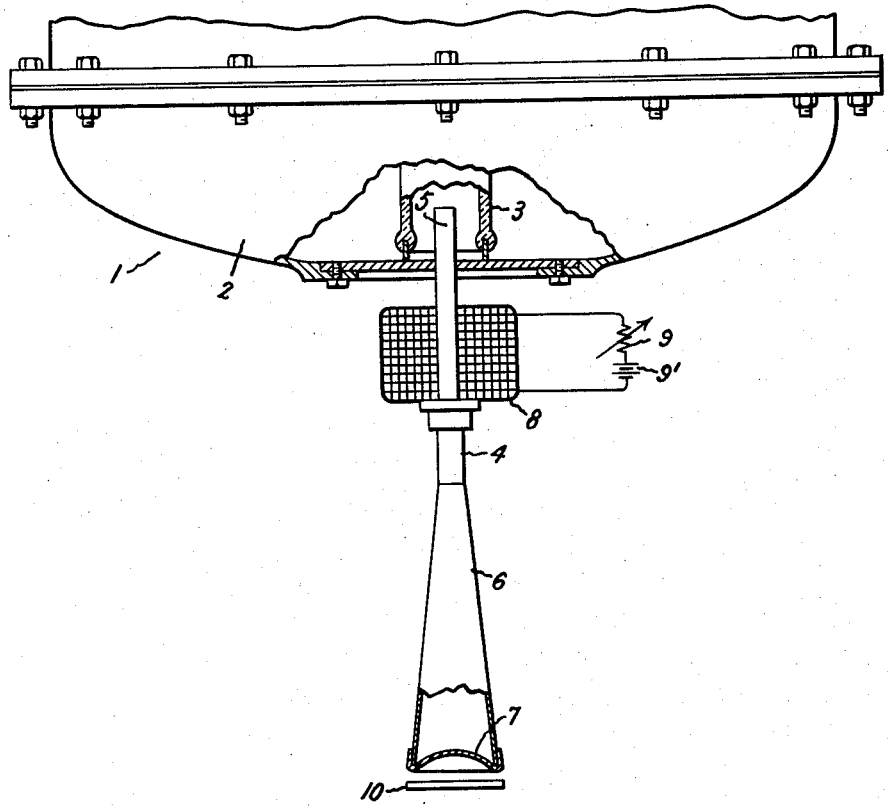

2,897,127
METHOD OF PRODUCING CROSS-LINKED POLYVINYL ALCOHOL

Alexander A. Miller, Schenectady, N.Y., assignor to General Electric Company, a corporation of New York Application August 29, 1955, Serial No. 531,181

6 Claims. (Cl. 204—154)

This invention relates to the cross-linking by high energy irradiation of polymers which normally degrade on such irradiation. More particularly, this invention relates to a method of producing cross-linked polyvinyl alcohol comprising (1) treating polyvinyl alcohol esters with high energy, ionizing radiation and (2) deacylating the ester so as to produce cross-linked polyvinyl alcohol.

In the preparation of articles from polyvinyl alcohol it is often necessary to cross-link and insolubilize this polymer. A great many methods have been used for rendering polyvinyl alcohol cross-linked and insoluble. When heat alone is used to cross-link the polymer, degradation also accompanies any cross-linking that occurs causing insoluble dark-colored products. The usual methods of cross-linking polyvinyl alcohol involve the use of chemical agents such as formaldehyde, chromium and iron compounds, cuprammonium hydroxide, titanium compounds, aluminum hydroxide, polycarboxylic acids, diisocyanates, cyclic ureas, phenol-formaldehyde, melamine-formaldehyde, etc. A good discussion of these cross-linking agents is found in Modern Plastics 28, 95 (March 1951). Thus, any method capable of cross-linking polyvinyl alcohol without degradation and without the use of extraneous chemical agents would be a decided advance in the art.

In Miller et al., J. Polymer Science 14, 503 (1954), it was stated that polymers of the general structure

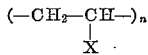

where X is a side radical, should cross-link upon high energy irradiation. Although polyvinyl alcohol, a compound within the scope of this formula, was expected to cross-link on irradiation, it was found that in practice it degraded, indicating that the cleavage predominated cross-linking. Thus, when dry (i.e. containing substantially no water) polyvinyl alcohol, either plasticized or unplasticized, was irradiated, degradation occurred as evidenced by a reduction in the intrinsic viscosity of solutions of the irradiated product. Therefore, it was assumed that polyvinyl alcohol could not be cross-linked with high energy irradiation.

The term "polyvinyl ester" as used herein refers to substantially completely esterified polyvinyl alcohols as well as the products of partially esterified polyvinyl alcohols which when irradiated cross-link to a greater extent than they degrade.

I have now discovered that while dry polyvinyl alcohol is degraded rather than cross-linked upon high energy irradiation, the esters of polyvinyl alcohol can be irradiated to produce a cross-linked product. Unexpectedly, I have also found that cross-linking takes place only on the polyvinyl alcohol moiety of the polyvinyl ester so that the carboxylic acid moiety of the ester can be removed by deacylation to produce cross-linked polyvinyl alcohol in yields which are substantially quantitative.

Since polyvinyl alcohol is prepared by the deacylation, such as by the hydrolysis or alcoholysis, of polyvinyl esters, my process requires no more steps than would be used had polyvinyl alcohol been able to be directly cross-linked by irradiation; for instead of deacylating and then irradiating, I irradiate prior to deacylation. Furthermore, in contrast to the cross-links produced by chemical agents which can be ruptured by chemical reagents such as acids and bases, the cross-links formed by irradiation are apparently chemically stable carbon to carbon bonds.

Although this invention encompasses the use of a wide variety of polyvinyl alcohol esters, most particularly the polyvinyl esters of the alkanoic acid series such as the esters of acetic, propionic, butyric, valeric, caproic, caprylic, capric, lauric, myristric, palmitic, stearic, and the like, the invention will be illustrated by the economically important and widely used polyvinyl acetate.

Since monomeric vinyl alcohol does not exist as such but rearranges to the more stable configuration of acetaldehyde, it is necessary to first polymerize vinyl alcohol esters which polymerized products are then deacylated to polyvinyl alcohol. Monomeric vinyl esters are generally prepared by the addition of acetylene to carboxylic acid in the presence of catalysts, for example, mercury salts, etc. This monomer can be polymerized in solution, in emulsion, or in suspension to yield polymers of varying molecular weights. The molecular weights of polyvinyl esters can vary within wide limits, for example, from about 20 to 200,000 or higher, the properties of the polymer varying with molecular weight. For example, the low polymers of polyvinyl acetate are comparatively soft, gum-like resins whereas the higher molecular weight polymers are tougher, higher-softening and comparatively form-stable. Polyvinyl acetates are supplied commercially under such trade names as Gelva (Shawinigan Products Corp.), Elvacet (Du Pont Co.), Vinylite Series A (Bakelite Corp.), Vinnapas (Wacker), Mowilith (Farbwerke Hoechst), as solids, aqueous emulsions and solutions in organic solvents. The preparation and properties of polyvinyl acetate, the polymerization and properties of the polymer thereof, the preparation and properties of the higher vinyl esters and the corresponding polymers are described more fully in chapter VI of Schildknecht, Vinyl and Related Polymers, page 323 to 386 (Wiley, 1952).

The physical form of the irradiated polyvinyl acetate is not critical provided that irradiation can sufficiently penetrate the polymer so as to cause cross-linking. In view of the fact that the acid moiety of the ester is removed in a subsequent step such as by hydrolysis or alcoholysis, it is preferred that the polyvinyl ester be in such form that will allow intimate contact with the deacylating agent. Thus, sheets, pellets, emulsions, suspensions, etc. of the esters are preferred. Cross-linked polyvinyl esters can be converted to cross-linked polyvinyl alcohol by any convenient method capable of replacing the acid moiety with a hydroxy group. Any of the methods used to prepare polyvinyl alcohol from polyvinyl esters can be used to deacylate cross-linked polyvinyl esters. Thus, the cross-linked polyvinyl esters can be deacylated with acids or bases dissolved in water or organic solvents, for example, the ethanol-KOH solutions disclosed in U.S. Patent 1,672,156, Herrmann et al., catalytic amounts of alkali or mineral acids as disclosed in U.S. Patent 2,109,883, Herrmann et al., etc. Since cross-linked polyvinyl esters are generally insoluble in the hydrolyzing medium, a kneaded uniform mass of the polymer can be hydrolyzed in a mixer of the type described in U.S. Patent 2,227,997, Berg. Although many other methods of hydrolyzing are known to those skilled in the art, an excellent summary of methods of hydrolyzing polyvinyl esters is found in Schildknecht, Vinyl and Related Polmers, page 341–344 (Wiley, 1952). If desired, the cross-linked polymer can be partially deacylated so as to yield a cross-linked polymer containing both hydroxy and ester groups.

In the drawing, there is shown high voltage accelerating apparatus 1 capable of producing a beam of high energy electrons for irradiating polyvinyl esters in accordance with the invention. High voltage accelerating apparatus 1 may be of the type disclosed in Patent 2,144,518, Westendorp, assigned to the same assignee as the present application. In general, this apparatus comprises a resonant system having on open magnetic circuit inductance coil (not shown) which is positioned within a tank 2 and energized by a source of alternating voltage to generate a high voltage across its extremities. At the upper end (not shown) of a sealed-off, evacuated, tubular envelope 3 is located a source of electrons which is maintained at the potential of the upper extremity of the inductance coil, whereby a pulse of electrons is accelerated down envelope 3 once during each cycle of the energizing voltage when the upper extremity of the inductance coil is at a negative potential with respect to the lower end. Further details of the construction and operation of high voltage accelerating apparatus 1 may be found in the aforementioned Westendorp patent and in "Electronics," vol. 16, page 128–133 (1944).

To permit utilization of the high energy electrons accelerated down envelope 3, there is provided an elongated metal tube 4, the upper portion 5 of which is hermetically sealed to tank 2, as illustrated, by any convenient means, such as silver solder. The lower portion 6 of tube 4 is conical in cross section to allow an increased angular spread of the electron beam. The emergence of high energy electrons from tube 4 is facilitated by an end-window 7 which may be hermetically sealed to tube 4 by means of silver solder. End-window 7 should be thin enough to permit electrons of desired energy to pass therethrough but thick enough to withstand the force of atmospheric pressure. Stainless steel of about 0.002 inch thickness has been found satisfactory for use with electron energies above 230,000 electron volts or greater. Beryllium and other materials of low stopping power may also be employed effectively. By forming end-window 7 in arcuate shape as shown, greater strength for resisting the force of atmospheric pressure may be obtained for a given window thickness. Desired focussing of the accelerated electrons may be secured by a magnetic-field generating winding 8 energized by a source of direct current 9' through a variable resistor 9.

In producing cross-linked polyvinyl alcohol according to the invention, sheets or pellets 10 of polyvinyl esters can be supported in the path of the electrons emerging from end-window 7 as illustrated. The high energy electrons penetrate the polymeric material to a depth dependent upon their energy and effect the above modifications in the properties of the material. Of course, 10 can be in the form of a strip material which is passed continuously under end-window 7 at a velocity selected to give the desired irradiation dosage. Other expedients for obtaining the irradiation of the polymeric materials in various shapes (e.g., bottles, cups, tubing, filaments, pipes, etc.) will be apparent to those skilled in the art. When the polymeric materials are initially in molten form suitable receptacles for containing them can be utilized. Uniform treatment of polymeric materials having appreciable thickness can be assured by irradiating them first from one side and then the other or in some cases from both sides simultaneously. In certain instances, it may be desirable to irradiate the polymeric materials in an atmosphere of nitrogen, argon, helium, krypton or zenon, etc., to prevent the damaging effect of any corona which may be present.

The measure of the amount of irradiation is a roentgen unit (r.) which, as usually defined, is the amount of radiation that produces one electrostratic unit of charge per milliliter of dry air under standard conditions and, as employed herein, refers to the amount of electron radiation measured with an air equivalent ionization chamber at the position of the upper surfaces of the polymeric materials.

The total irradiation dose to which the polyvinyl acetate is subjected will depend on the properties desired in the cross-linked polyvinyl alcohol i.e. from soft, resilient, low melting solid to a hard, stiff, high melting solid. Thus, a total dose of from 1 megaroentgen (mr.) to 50 mr. or higher can be advantageously employed. This irradiation can be carried out below room, at room, or at elevated temperatures.

It will be readily realized that other forms of electron accelerating apparatus may be employed instead of high voltage apparatus 1. For example, linear accelerators of the type described by J. C. Slater in the "Reviews of Modern Physics," vol. 20, No. 3, pages 473–518 (July 1948), may be utilized. To decrease wasteful energy absorption between the point of exit of electrons from the accelerating apparatus and the polymeric materials, a vacuum chamber having thin entrance and exit windows may be inserted in the space.

In general, the energy of the irradiation preferably employed in the practice of my invention may range from about 50,000 to 20 million electron volts or higher depending upon the depth to which it is desired to affect the polymeric materials. Although high energy electron irradiation of the type described is preferred since it can produce a large amount of easily controllable high energy, ionizing radiation within a short period of time without rendering the product radioactive, many other sources of high energy, ionizing radiation can also be used in our invention. Examples of such ionizing radiation sources are gamma rays, such as can be obtained from $Co^{60}$, "burnt" uranium slugs, fission by-products, such as waste solutions, separated isotopes, such as $Cs^{137}$, gaseous fission products liberated from atomic reactions, etc.; other electron sources, such as the betatron, etc.; fast ors low neutrons or the mixed neutron and gamma radiation, such as is present in certain atomic reactors; X-rays; and other miscellaneous sources, such as protons, deuterons, α-particles, fission fragments, such as are available from modern cyclotrons, etc.

In order that those skilled in the art may better understand how the present invention may be practiced, the following examples are given by way of illustration and not by way of limitation. All parts and percentages are by weight. Irradiation in all examples was carried out with high energy electrons (800 kilovolt peak, kvp.) derived from a resonant transformer cathode ray unit of the type shown in the drawing.

The following examples illustrate that dry polyvinyl alcohol degrades upon irradiation.

Films of polyvinyl alcohol (5 mils) were cast from a 10% soution of Du Pont's Elvanol 72–51 (98% hydrolyzed) and thoroughly dried under vacuum at room temperature. Six one inch squares of this film were piled on each other and irradiated with high-energy electrons at a dose rate of 15 mr./min. The irradiated samples dissolved in hot water even more readily than the corresponding unirradiated material. Even a dose as high as 100 mr. failed to produce water-insoluble (cross-linked) product. Intrinsic viscosities [η] of the unirradiated and irradiated polyvinyl alcohol were measured in aqueous solutions at 25° C. and viscosity average molecular weights ($\bar{M}_v$) were calculated according to the following formula: $[\eta]=2\times10^{-4}M^{0.76}$. The results are shown in Table I.

TABLE I

*Irradiation of dry polyvinyl alcohol*

| Example | Irradiation dose, mr. | [η] | $\bar{M}_v$ |
|---|---|---|---|
| 1 | 0 | 0.93 | 70,000 |
| 2 | 10 | 0.60 | 37,600 |
| 3 | 20 | 0.53 | 32,300 |
| 4 | 50 | 0.40 | 21,700 |

These results clearly show that the high energy irradiation of dry polyvinyl alcohol causes degradation in its molecular weight.

The following examples were carried out to determine if the degradation occurred when dry commercial polyvinyl alcohol in various other forms degraded when irradiated. In these examples commercial samples were irradiated with an electron beam at doses of $10^6$ and $10^7$ r. The specific viscosities of aqueous solutions of the irradiated materials were compared with those of unirradiated controls at the same concentration as shown in Table II.

TABLE II

| Example | Polyvinyl alcohol | Dose (r.) | $[\eta]$ specific |
|---|---|---|---|
| 5 | Reynolon 4301 (film) (Reynolds) | 0 | 2.3 |
| 6 | ----do---- | $10^7$ | 2.0 |
| 7 | Elvanol 72-51 (powder) (Du Pont) | 0 | 3.7 |
| 8 | ----do---- | $10^6$ | 3.2 |
| 9 | ----do---- | $10^7$ | 1.7 |
| 10 | Solvar 10/66 (powder) (Shawinigan) | 0 | 3.3 |
| 11 | ----do---- | $10^7$ | 1.7 |

The decrease in the specific viscosities of the irradiated samples demonstrates that dry polyvinyl alcohol is degraded by high energy radiation.

EXAMPLE 12

This example illustrates the irradiation of a polyvinyl ester.

Granular polyvinyl acetate (Gelva 60, Shawinigan) was pressed into a 50 mil sheet. The uncross-linked polyvinyl acetate was soluble in acetone. One part of this sheet was irradiated at $10^7$ r., and another at $10^8$ r. in air. Both of the irradiated samples swelled but did not dissolve in acetone. The amount of swelling of the $10^8$ r. sample was less than that of the $10^7$ r. sample, indicating a higher degree of cross-linking at the higher dose.

EXAMPLE 13

Granular polyvinyl acetate (Gelva 100) was irradiated in granular form in a nitrogen atmosphere to a dose of $2 \times 10^7$ r. The irradiated product swelled but did not dissolve in acetone.

All of the above irradiated esters were deacylated to yield cross-linked polyvinyl alcohol in almost quantitative yields. The following example is presented as illustrative of the procedure.

EXAMPLE 14

Granular polyvinyl acetate (195 parts) which had been irradiated at $2 \times 10^7$ r. was boiled in 1% methanolic sodium hydroxide for about one hour. The product was washed with water to free it of both alkali and methanol. This washed product dried to a constant weight (94 parts) corresponded to a 94% yield.

The products of this invention can be used in the manner of the polyvinyl alcohols of the prior art which have not been cross-linked. Being cross-linked, my products possess the added properties of being more resilient, more water resistant, less susceptible to heat distortion, etc. Whereas products made of polyvinyl alcohol of the prior art have been restricted to uses that do not involve contact with water, products prepared from cross-linked polyvinyl alcohol can be used in the presence of water, for example, textiles, leather or other sheet material can be immersed in solutions of polyvinyl acetate or in the molten polymer, irradiated, and then deacylated so as to leave a layer of cross-linked polyvinyl alcohol on the sheet material. They may be used in applications where polyvinyl alcohol cross-linked with chemical agents are now used. Extruded tubing of cross-linked polyvinyl alcohol prepared according to this invention can be used in refrigeration systems, air-conditioning units, dry-cleaning equipment, electrical equipment such as X-ray equipment, etc. It can be used to pipe materials such as solvents, oils, greases, aqueous solutions and other chemicals that will attack other types of flexible tubing. Examples of molded, cross-linked products comprise diaphragms, gaskets, valve disks, vacuum cups, packing, etc.

Films of polyvinyl alcohol prepared according to this invention are useful as metal or fiber liners, containers, covers, closures, electrical insulating tapes, dielectric materials in electric capacitors, etc. Whereas polyvinyl alcohol, which has not been cross-linked, is affected by water, the cross-linked products of this invention extends its horizons to the application where contact with water is necessary. Filaments and fibers can be prepared, for example, by extruding polyvinyl esters into an area exposed to radiation followed by deacylation of the irradiated product.

What I claim as new and desire to secure by Letters Patent of the United States is:

1. A process of preparing cross-linked polyvinyl alcohol comprising (1) irradiating an ester of polyvinyl alcohol with electrons having energy equivalent to at least $5 \times 10^4$ electron volts to a radiation dose in the range of $1 \times 10^6$ to $5 \times 10^7$ r. and (2) deacylating said ester.

2. The process of claim 1 in which the ester is of the alkanoic acid series.

3. The process of claim 2 in which the ester is vinyl acetate.

4. Process of claim 1 in which the deacylating agent is an alcoholic solution of a base.

5. The process of claim 1 in which the polyvinyl ester is a film.

6. The process of claim 1 in which the energy of the electrons is in the range of from $5 \times 10^4$ to $2 \times 10^7$ electron volts.

References Cited in the file of this patent

FOREIGN PATENTS

| 582,559 | Great Britain | Nov. 20, 1946 |
| 732,047 | Great Britain | June 15, 1955 |
| 282,096 | Switzerland | July 16, 1952 |

OTHER REFERENCES

Symposium on Utilization of Radiation from Fission Products, Harwell A.E.R.E., C/R 1231, pages 112–117, Feb. 23, 24, 1953.